(12) United States Patent
Sakamoto

(10) Patent No.: US 7,656,774 B2
(45) Date of Patent: Feb. 2, 2010

(54) OBJECTIVE LENS, OPTICAL HEAD, AND OPTICAL PICKUP APPARATUS

(75) Inventor: Katsuya Sakamoto, Saitama (JP)

(73) Assignee: Konica Minolta Opto, Inc., Tokyo (JP)

( * ) Notice: Subject to any disclaimer, the term of this patent is extended or adjusted under 35 U.S.C. 154(b) by 545 days.

(21) Appl. No.: 11/547,686

(22) PCT Filed: Mar. 24, 2005

(86) PCT No.: PCT/JP2005/005316

§ 371 (c)(1),
(2), (4) Date: Oct. 5, 2006

(87) PCT Pub. No.: WO2005/098838

PCT Pub. Date: Oct. 20, 2005

(65) Prior Publication Data

US 2007/0211605 A1      Sep. 13, 2007

(30) Foreign Application Priority Data

Apr. 9, 2004   (JP) ............................. 2004-116269

(51) Int. Cl.
*G11B 7/00*   (2006.01)
(52) U.S. Cl. ............................. 369/112.24; 369/44.23; 359/644
(58) Field of Classification Search ........................ None
See application file for complete search history.

(56) References Cited

U.S. PATENT DOCUMENTS

| | | | | |
|---|---|---|---|---|
| 4,184,747 A | * | 1/1980 | Uetake | 359/659 |
| 4,610,515 A | * | 9/1986 | Tanaka | 359/784 |
| 4,784,478 A | * | 11/1988 | Takada | 359/654 |
| 5,202,867 A | * | 4/1993 | Matsui et al. | 369/44.23 |
| 5,214,537 A | * | 5/1993 | Maruyama | 359/644 |

FOREIGN PATENT DOCUMENTS

| | | |
|---|---|---|
| JP | 59-176715 A | 10/1984 |
| JP | 60-91317 A | 5/1985 |
| JP | 63-106713 A | 5/1988 |
| JP | 05-307139 | 11/1993 |
| JP | 6-138384 A | 5/1994 |
| JP | 11-223762 | 8/1999 |
| JP | 2003-84196 A | 3/2003 |

* cited by examiner

*Primary Examiner*—Wayne R Young
*Assistant Examiner*—Van N Chow
(74) *Attorney, Agent, or Firm*—Cohen Pontani Lieberman & Pavane LLP

(57) ABSTRACT

An objective lens for at least one of recording and reproducing for an optical information recording medium includes in the order from a light source side: a first lens group having negative refracting power, which is in a meniscus shape having a concave surface facing the light source side; a second lens group having positive refracting power; and a third lens group having positive refracting power, which is in a meniscus shape having a concave surface facing an image side.

8 Claims, 11 Drawing Sheets

US 7,656,774 B2

OBJECTIVE LENS, OPTICAL HEAD, AND OPTICAL PICKUP APPARATUS

RELATED APPLICATIONS

This is a U.S. National Phase Application under 35 USC 371 of International Application PCT/JP2005/005316, filed Mar. 24, 2005.

BACKGROUND OF THE INVENTION

The present invention relates to an objective lens for recording and/or reproducing for an optical information recording medium, and to an optical head and an optical pickup apparatus employing the objective lens.

Up to this time, various types of optical pickup apparatuses for conducting reproduction and recording for an optical information recording medium such as CD (compact disc) have been developed and manufactured to be made popular generally. AS objective lenses to be incorporated in these optical pickup apparatuses, there exist those each being made to be of a three-group structure to have low aberration and high NA (numerical aperture) (see Japanese Patent Application Publication No. 2003-84196).

Incidentally, if an objective lens is not limited to those for recording and reproducing for optical information, various types of objective lenses which are telecentric and of a retrofocus type are used in the fields for, for example, photographing and an endoscope (see Japanese Patent Application Publication Nos. 11-223762 and 05-307139).

However, with respect to an objective lens for an optical pickup apparatus, the telecentric optical system is not usually used, because high NA and weight reduction are required. When the objective lens is made to be telecentric, a value of NA has to be made small or the number of constituent lenses has to be increased, for correcting respective aberrations such as spherical aberration, curvature of field, distortion, coma and astigmatism. Further, even when the objective lens is made to be of a retrofocus type, it is not easy to manufacture an objective lens having less aberration with a small number of lenses.

On the other hand, when an objective lens for an optical pickup apparatus is made to be telecentric toward the image side, sharp image formation is possible in the course of information reading, which enhances pickup capability. Further, when an objective lens for an optical pickup apparatus is made to be of a retrofocus type, it is possible to enhance an NA value without increasing a diameter of an incident light flux, and thereby to enlarge a back focus corresponding to a working distance.

SUMMARY OF THE INVENTION

With this background, an object of the invention is to provide an objective lens for optical recording and/or reproducing wherein generation of various aberrations can be controlled efficiently with a relatively small number of lenses and relatively high NA can be attained while securing sharp image formation.

Further, an object of the invention is to provide an optical head and an optical pickup apparatus in which the objective lens like that described above is incorporated.

An embodiment of the invention for attaining the aforesaid object is an objective lens for recording and/or reproducing for an optical information recording medium, wherein there are provided (a) the first lens group which is in a meniscus shape having its concave surface facing the light source side and has the negative refracting power, (b) the second lens group having the positive refracting power and (c) the third lens group which is in a meniscus shape having its concave surface facing the image side and has the positive refracting power, in this order from the light source side.

DETAILED DESCRIPTION OF THE PREFERRED EMBODIMENT

Figure 1:
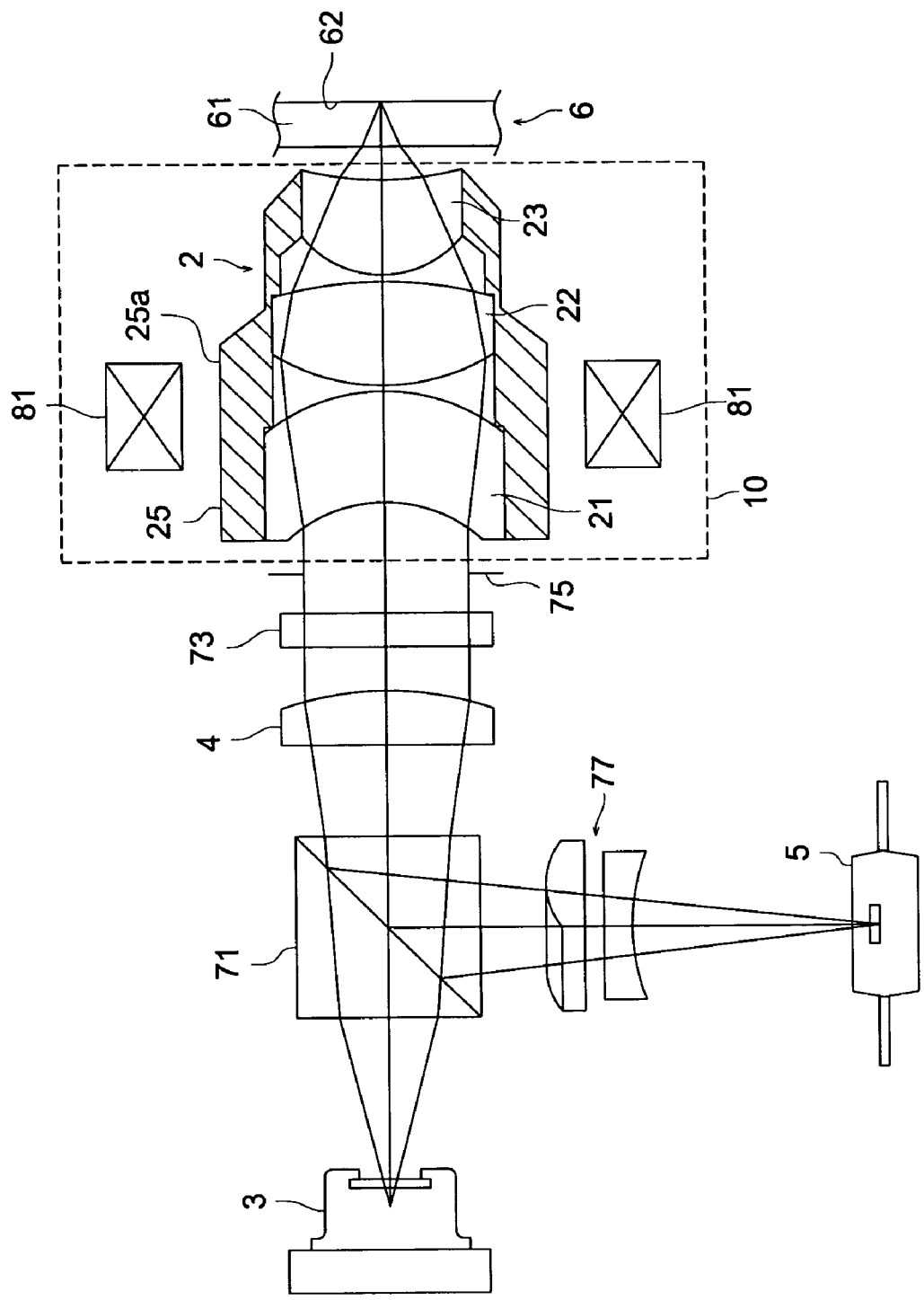
FIG. 1 is a diagram illustrating the structure of an optical pickup apparatus relating to an embodiment of the invention.

The aforesaid objects of the invention are attained by one of the following structures (1) to (9).

(1) An objective lens for recording and/or reproducing for an optical information recording medium, wherein there are provided (a) the first lens group which is in a meniscus shape having its concave surface facing the light source side and has the negative refracting power, (b) the second lens group having the positive refracting power and (c) the third lens group which is in a meniscus shape having its concave surface facing the image side and has the positive refracting power, in this order from the light source side.

Incidentally, each of the first to third lens groups is to be composed of a single lens in principle for the purpose of a simple structure and light weight of an objective lens. However, any one of them is allowed to be a lens wherein a plurality of lenses are cemented.

Meanwhile, "the objective lens" relating to the invention is one that is moved in an integrated manner by an actuator for the purpose of focusing and tracking.

In the aforesaid objective lens, it is possible to make the field curvature small by reducing Petzval sum, because the first lens group having the negative refracting power is in a meniscus shape having its concave surface facing the light source side. It is further possible to make the working distance to be long, because the third lens group having the positive refracting power is in a meniscus shape having its concave surface facing the image side. After all, it is possible to attain high NA while controlling generation of various aberrations efficiently, with relatively small number of lens groups, which makes it possible to conduct optical recording and/or reproducing that is highly accurate and is of high density.

(2) In the aforesaid objective lens, the following conditions are satisfied under the assumption that f1 represents a focal length of the first lens group and f23 represents a combined focal length of the second and third lens groups.

$$0.01 < |f23/f1| < 0.10 \quad (1)$$

When the objective lens is composed of the first lens group, the second lens group and the third lens group as stated above, this objective lens is of the lens structure of a retrofocus type in which a value of NA can be made large independently of a diameter of an incident light flux to gain a back focal distance corresponding to a working distance. In this case, by satisfying the aforesaid conditional expression (1), it is possible to make coma that is caused when an image height grows greater to be small, and thereby to secure telecentricity sufficiently and to form a desired converged spot, under the condition that the working distance is secured. In particular, when the first half condition $0.01<|f23/f1|$ is satisfied, it is possible to make coma that is caused when an image height grows greater to be small, under the condition that the working distance is secured.

On the other hand, when the latter half condition $|f23/f1|<0.10$ is satisfied, it is possible to secure telecentricity sufficiently under the condition that the working distance is secured.

Further, more preferable condition is to satisfy $0.06<|f23/f1|<0.08$.

A term "telecentricity" used in the aforesaid explanation means an occasion where, for example, a half field angle is 2.5° and principal ray angle is 0.01° or less.

(3) In the aforesaid objective lens, a value of numerical aperture NA on the image side satisfies the following condition.

$$0.50 < NA < 0.90 \quad (2)$$

In this case, the aforesaid objective lens can be used properly as an objective lens capable of forming images with less aberration for optical recording and/or reproducing for an optical pickup apparatus that requires the aforesaid conditions. It is further suitable for use in an optical pickup apparatus requiring $0.70<NA<0.90$ and higher NA.

(4) The aforesaid objective lens has a prescribed telecentricity on the image side. In this case, it is possible to form sharp images in recording and/or reproducing for optical information, and the optical pickup capability can be enhanced.

(5) In the aforesaid objective lens, each of the second lens group and the third lens group is an aspheric lens. In this case, various aberrations of the objective lens can further be controlled.

(6) In the aforesaid objective lens, each of the first to third lens groups is formed with glass lenses. In this case, it is possible to enhance processing accuracy and stability of the objective lens and to enhance image forming capability.

(7) An optical head having the aforesaid objective lens that converges an incident light flux as a spot, and forming an optical spot on a recording surface of an optical information recording medium by the objective lens.

In the aforesaid optical head, there is used an objective lens capable of attaining high NA while controlling generation of various aberrations efficiently, with relatively small number of lens groups, thus, it is possible to conduct recording and/or reproducing for optical information that is highly accurate and is of high density.

(8) The first optical pickup apparatus that is provided with the aforesaid optical head and is capable of reading information on a recording surface of an optical information recording medium through the optical head, or of writing information on the recording surface.

Since the aforesaid optical pickup apparatus employs an optical head like that described above, highly accurate and stable recording and/or reproducing can be conducted for optical information recording media in various standards including a standard of high recording density.

(9) The second optical pickup apparatus that is provided with (a) a light source emitting illuminant light having a prescribed wavelength, (b) the aforesaid objective lens that converges illuminant light coming from the light source and forms an optical spot on a recording surface of an optical information recording medium and with (c) a sensor (which is also called a photodetector) that detects reflected light coming from the recording surface of the optical information recording medium through the objective lens, and conducts recording and/or reproducing of information for an optical information recording medium.

Since the aforesaid optical pickup apparatus employs an objective lens like that described above, highly accurate and stable recording and/or reproducing can be conducted for optical information recording media in various standards including a standard of high recording density.

First Embodiment

FIG. 1 is a diagram illustrating the structure of an optical pickup apparatus relating to an embodiment of the invention. This optical pickup apparatus is equipped with objective lens 2 of a three-group three-element structure, semiconductor laser 3 representing a light source, coupling lens 4 of a one-group one-element structure that changes a divergence angle of divergent light emitted from the semiconductor laser 3 and with photodetector (which is also called a sensor) that receives reflected light coming from optical disc 6 representing an optical information recording medium.

An optical pickup apparatus shown in FIG. 1 is further provided with polarizing beam splitter 71 that separates reflected light coming from optical disc 6 toward photodetector 5, quarter-wave plate 73 arranged between objective lens 2 and coupling lens 4, diaphragm 75 arranged before the objective lens 2, astigmatism optical system 77 composed of a cylindrical lens and a concave lens and with biaxial actuator 81 for focusing and tracking. In addition, the optical pickup apparatus has therein a light source drive circuit that operates semiconductor laser 3 properly, a sensor drive circuit that operates photodetector 5 properly and a displacement drive circuit that operates the biaxial actuator 81, although they are not illustrated.

In optical pickup apparatus shown in FIG. 1, semiconductor laser 3 is one that generates a laser beam having a wavelength of 500 nm or less, for example, and it is possible to reproduce information recorded highly densely on optical disc 6 representing an optical information recording medium and/or to record high density information on the optical disc 6.

Further, the objective lens 2 is composed of first lens 21 that constitutes the first lens group individually, second lens 22 that constitutes the second lens group individually and third lens 23 that constitutes the third lens group individually. These first to third lenses 21 to 23 are arranged accurately to be united solidly and fixed by holder 25, whereby, total objective lens 2 can be installed accurately on optical head 10, by utilizing flange section 25a of the holder 25.

NA of this objective lens 2 on the optical disc 6 side is in a range of 0.70 to 0.90 to meet the standards for relatively high recording density. Further, the objective lens 2 has telecentricity on the optical disc 6 side, thereby, sharp images can be formed in recording and reproducing of optical information, which enhances the optical pickup capability. In addition, the objective lens 2 can be considered a lens system of a retrofocus type composed of the first lens 21 having the negative refracting power and the second and third lenses 22 and 23 having the positive refracting power on the whole, thus, NA on the optical disc 6 side can be made large, and a working distance corresponding to the distance up to the optical disc 6 can be gained relatively sufficiently.

In the more detailed explanation, first lens 21 is a meniscus lens having the negative refracting power wherein the concave surface faces semiconductor laser 3 representing a light source, in the objective lens. Owing to this, the curvature of field can be made small by making Petzval sum to be made small. Further, second lens 22 is a two-sided convex lens that collimates a light flux diverged by the first lens 21 to be parallel properly or converges the light flux. Further, third lens 23 has the positive refracting power and can converge a light flux which has passed through the second lens 22 on information recording surface 62 of optical disc 6 as a minute spot. In this case, the third lens 23 is a meniscus lens whose concave surface faces the optical disc 6 side, which makes a working distance to be long. In the objective lens 2 having the aforesaid structure, it is possible to attain high NA while controlling generation of various aberrations efficiently, with relatively small number of lenses, which makes it possible to conduct optical recording and/or reproducing that is highly accurate and is of high density.

In the aforesaid objective lens 2, the following conditional expression is satisfied under the assumption that f1 represents a focal length of the first lens 21 and f23 represents a combined focal length of the second and third lenses 22 and 23.

$$0.01 < |f23/f1| < 0.10 \quad (1)$$

In this case, when the first half condition $0.01 < |f23/f1|$ is satisfied, it is possible to make coma that is caused when an image height grows greater, to be small, under the condition that the working distance is secured. On the other hand, when the latter half condition $|f23/f1| < 0.10$ is satisfied, it is possible to secure telecentricity sufficiently under the condition that the working distance is secured.

Operations of the optical pickup apparatus shown in FIG. 1 will be explained as follows. First, when reproducing information from optical disc 6, a laser beam is emitted from semiconductor laser 3. The light flux emitted from the semiconductor laser 3 passes through polarizing beam splitter 71, coupling lens 4 and quarter-wave plate 73 to become a collimated light flux of circularly polarized light. This light flux is stopped down by diaphragm 75 and is converged by the objective lens 2 on information recording surface 62 through transparent base board 61 of optical disc 6.

The light flux modulated by information pits and is reflected on information recording surface 62 passes through again objective lens 2, diaphragm 75, quarter-wave plate 73 and coupling lens 4, to enter polarizing beam splitter 71. The light flux which has entered the polarizing beam splitter 71 is reflected therein, and then, is given astigmatism when passing through astigmatism optical system 77, and enters photodetector 5. By using output signals of the photodetector 5, there are obtained signals to read information recorded on optical disc 6.

In this case, a change in quantity of light caused by a change in shape and a change in position of a spot on photodetector 5 is detected, and detection of focusing and detection of tracking are conducted. Based on this detection, biaxial actuator 81 incorporated in optical head 10 moves objective lens 2 in the optical axis direction so that a light flux emitted from semiconductor laser 3 may form an image on information recording surface 62 of optical disc 6, and moves objective lens 2 in the direction perpendicular to the optical axis so that a light flux emitted from semiconductor laser 3 may form an image on a prescribed track.

The foregoing has been an explanation for an occasion to reproduce information coming from optical disc 6, and the same operations as those explained above are carried out as far as the optical axis shown in FIG. 1 is concerned, even when recording information on optical disc 6. However, the inlensity of a laser beam emitted from semiconductor laser 3 is set to the prescribed threshold value for recording or higher. Further, the sequences such as tracking, focusing and confirming of information to be written in the case of writing may be changed properly by adjusting them to a use and specifications of the optical pickup apparatus.

EXAMPLE 1

Specific examples of the objective lens 2 incorporated in the pickup apparatus shown in FIG. 1 will be explained as follows. Incidentally, in the following Table 2 and Table 4, "−1.1723×E−4", for example, means "$-1.1723 \times 10^{-4}$".

First Example

The first example is an objective lens wherein focal length f1 of the first lens 21 is −71.54 mm, combined focal length f23 of the second and third lenses 22 and 23 is 4.50 mm, total focal length F is 3.20 mm and numerical aperture NA on the image side is 0.71.

Specifications of the objective lens relating to the first example are shown in the following Table 1. In the Table 1, "$i^{th}$ surface" represents a surface number of the lens surface counted from the light source side, "ri" represents a radius of curvature of the lens surface corresponding to the "ri", "di" represents a distance on the optical axis from the lens surface corresponding to the "di" to the next lens surface, "ni" represents a refractive index from the corresponding lens surface to the next lens surface and "Remarks" respectively show an aperture diameter and lens materials for glass lenses.

TABLE 1

| | $i^{th}$ surface | ri | di | ni (400 nm) | Remarks |
|---|---|---|---|---|---|
| | 0 | | ∞ | | |
| | 1 | ∞ | −0.3740 | | Aperture diameter φ 4.3 mm |
| First lens (L1) | 2 | −3.7175 | 5.5700 | 1.5869 | BAC4 |
| | 3 | −6.3387 | 0.1000 | 1.0000 | |
| Second lens (L2) | 4 | 10.8819 | 1.7300 | 1.6960 | BAF10 |
| | 5 | −37.9812 | 0.1000 | 1.0000 | |
| Third lens (L3) | 6 | 4.1766 | 4.9700 | 1.6960 | BAF10 |
| | 7 | 12.1924 | 0.4715 | 1.0000 | |
| | 8 | ∞ | 1.2000 | 1.5308 | |
| | 9 | ∞ | 0.000 | 1.0000 | |

In Table 1 above, each of the fourth to seventh surfaces is an aspheris surface. The conic constant κ of each surface and aspheric surface coefficient $A_{2i}$ are given by the following Table 2.

TABLE 2

Aspheric surface data

| 4th surface | Conic constant | κ | −2.0110 × E−0 |
|---|---|---|---|
| | Aspheric surface coefficient | A4 | −1.1723 × E−4 |
| | | A6 | +2.3673 × E−5 |
| | | A8 | −8.7394 × E−7 |
| 5th surface | Conic constant | κ | −9.0062 × E−1 |
| | Aspheric surface coefficient | A4 | −4.7531 × E−5 |
| | | A6 | +1.7035 × E−5 |
| | | A8 | −6.6194 × E−7 |
| 6th surface | Conic constant | κ | −8.4977 × E−1 |
| | Aspheric surface coefficient | A4 | +1.5762 × E−3 |
| | | A6 | +2.8873 × E−5 |
| | | A8 | +2.1379 × E−6 |
| | | A10 | −4.8219 × E−8 |
| | | A12 | +1.0884 × E−8 |
| 7th surface | Conic constant | κ | −5.6942 × E−0 |
| | Aspheric surface coefficient | A4 | +6.7076 × E−3 |
| | | A6 | −7.4512 × E−3 |
| | | A8 | +3.3162 × E−3 |
| | | A10 | −3.6127 × E−4 |
| | | A12 | −1.1502 × E−4 |

In the Table 2 above, a shape of aspheric surface is given by the following expression, under the assumption that x represents a distance between a point on the aspheric surface whose height from the optical axis is h and a plane that is tangent to the vertex of the aspheric surface, h represents a height from the optical axis, c represents the curvature on the vertex of the aspheric surface (=1/r), κ represents the conic constant and $A_{2i}$ represents $2i^{th}$ (I is a natural number of 2 or more) aspherical surface coefficient.

$$x = \frac{h^2 \cdot c}{1 + \sqrt{1 - (1+\kappa)h^2 \cdot c^2}} + \sum_{i=2} A_{2i} h^{2i} \quad \text{(Numeral 1)}$$

Figure 2:
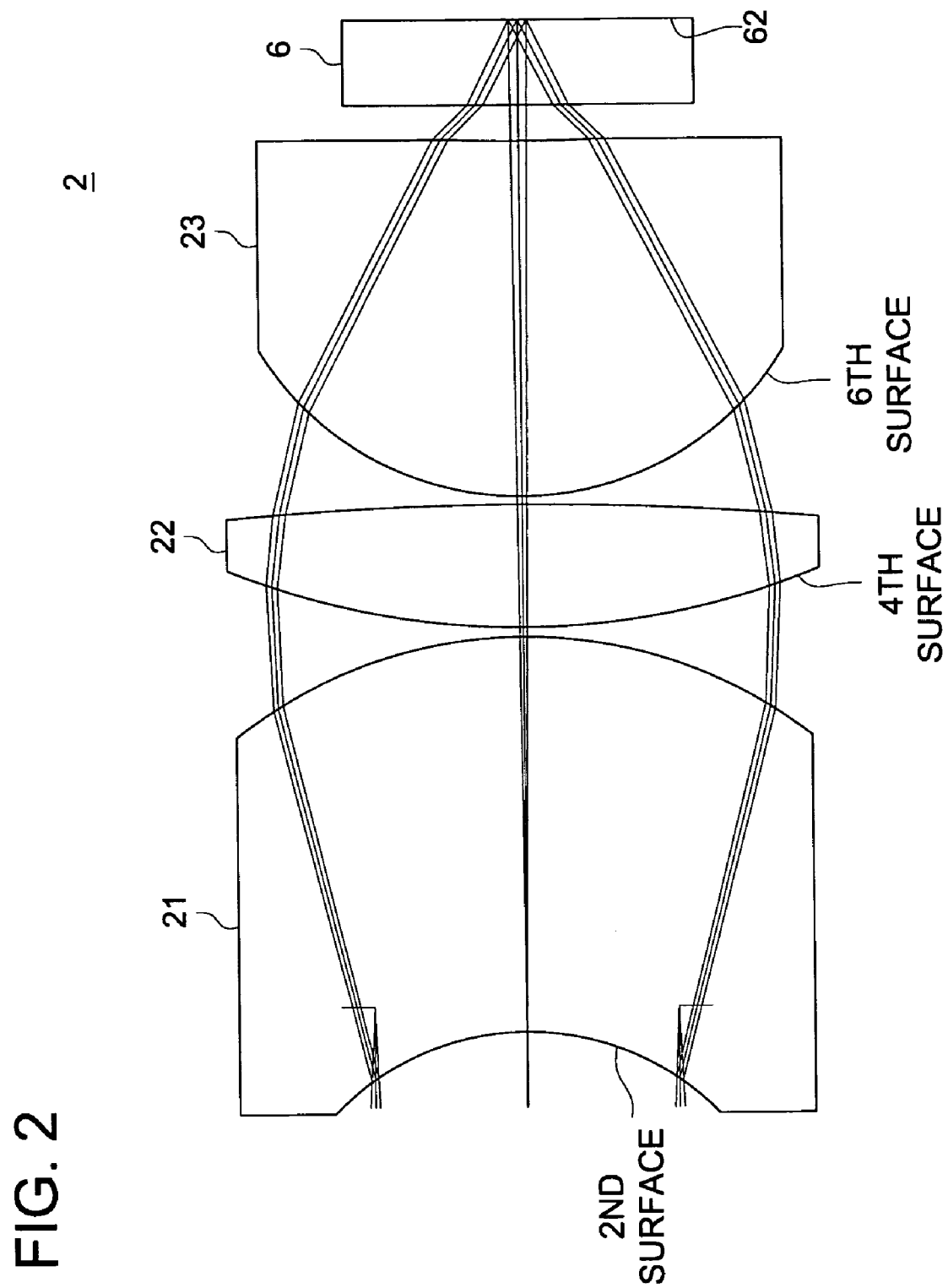
FIG. 2 is an optical path diagram of an objective lens in the first example.
Figure 3:
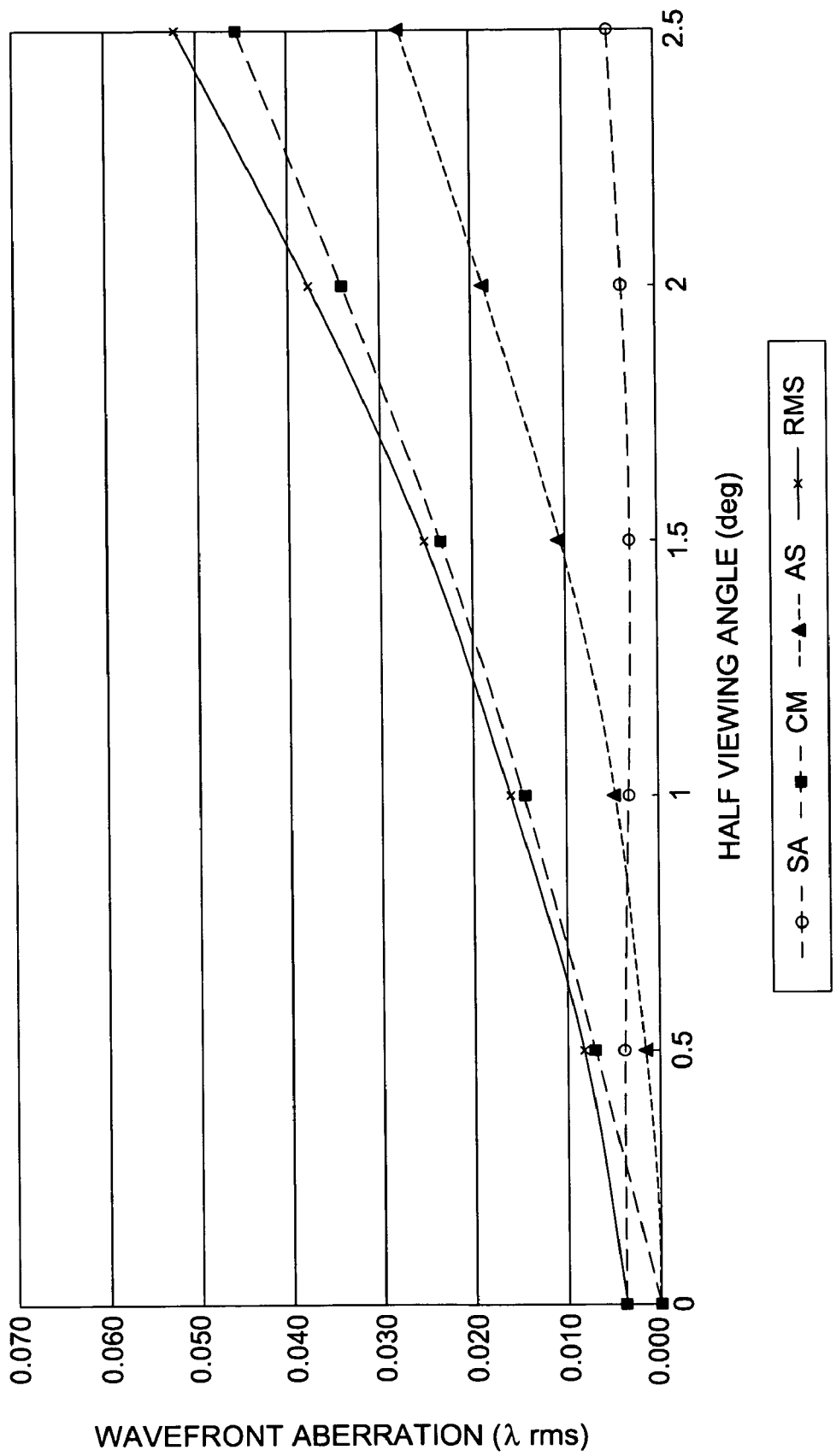
FIG. 3 is a diagram showing wavefront aberration of an objective lens in the first example.
Figure 4:
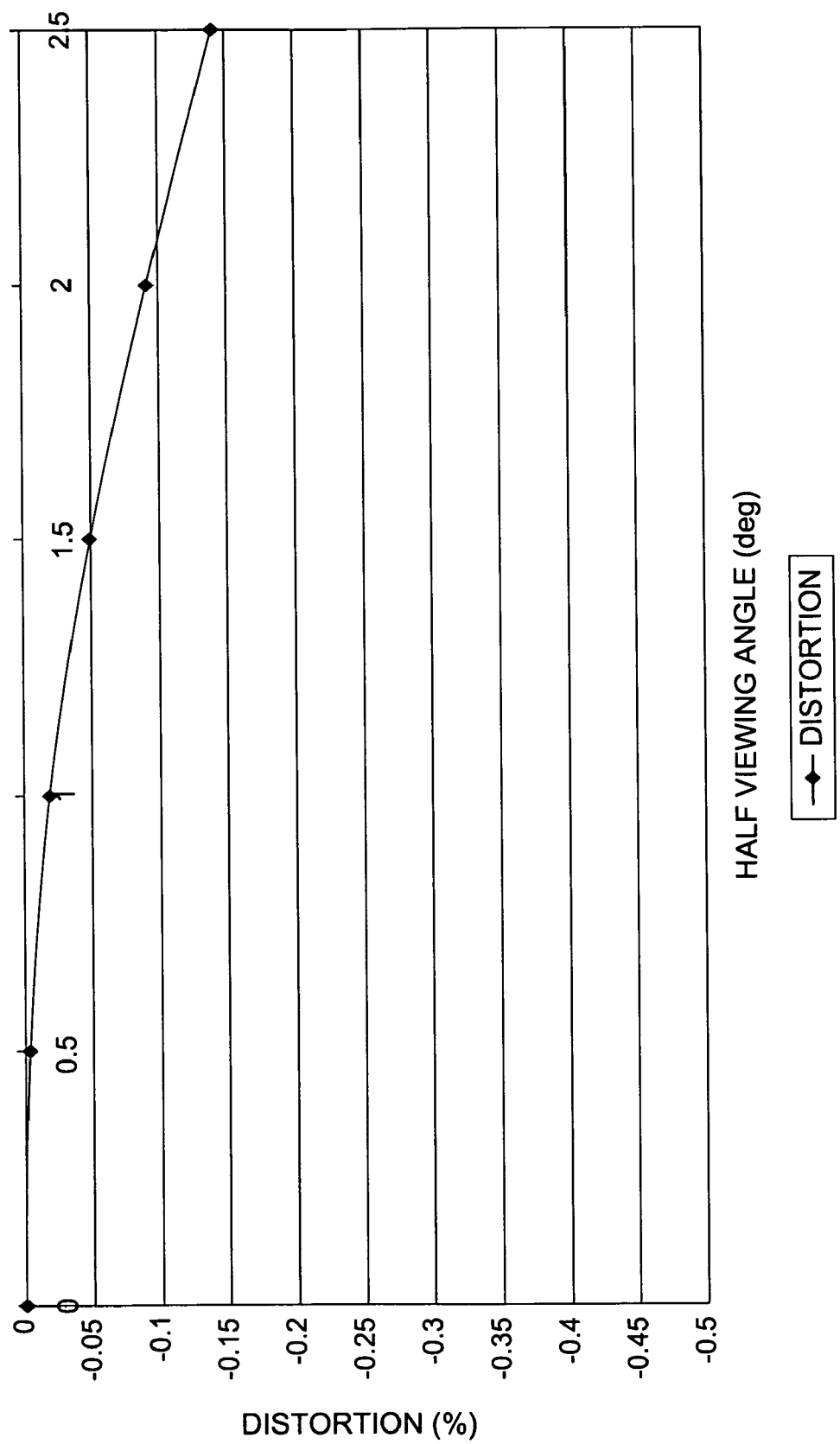
FIG. 4 is a diagram showing distortion of an objective lens in the first example.
Figure 5:
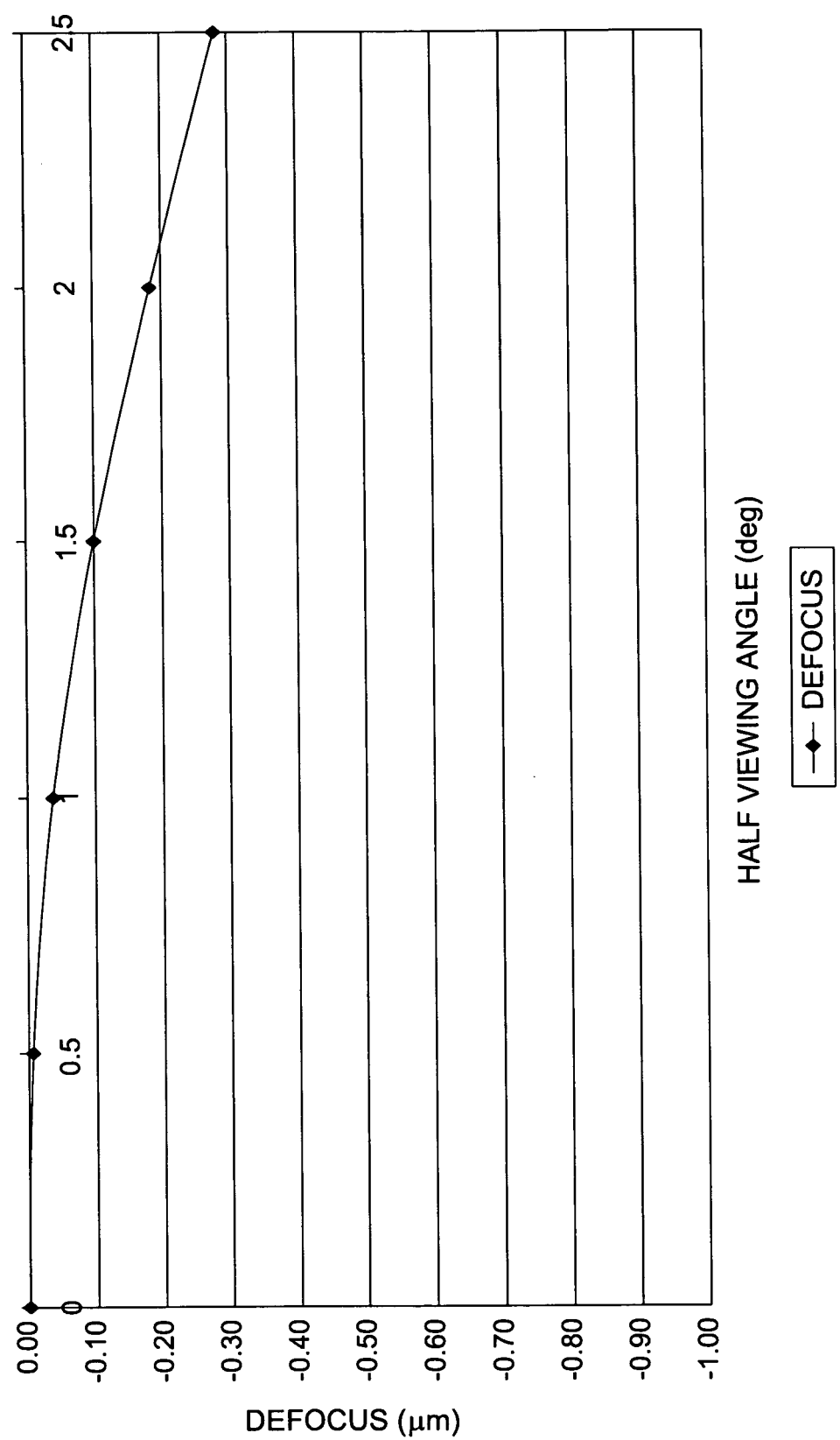
FIG. 5 is a diagram showing field curvature of an objective lens in the first example.
Figure 6:
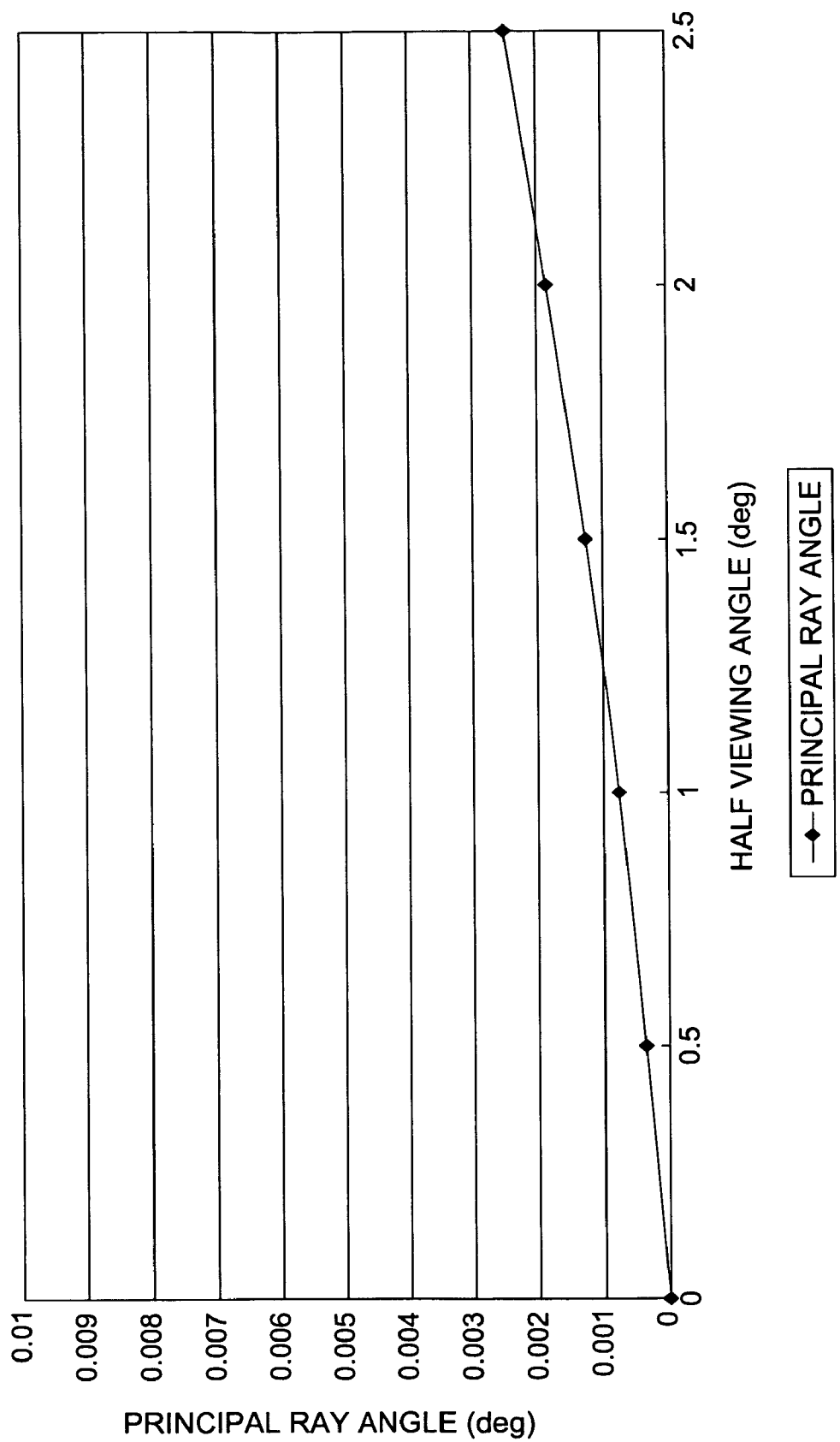
FIG. 6 is a diagram showing telecentricity of an objective lens in the first example.

FIG. 2 is an optical path diagram of objective lens 2 in the first example. Each of FIG. 3 to FIG. 6 shows aberration characteristics of objective lens 2 of the first example. Namely, FIG. 3 shows an amount of wavefront aberration corresponding to an image height in the first example. In this case, wavefront aberrations in the case of changing a half field angle properly are indicated as SA (spherical aberration), CM (coma), AS (astigmatism) and RMS (the root mean square of these aberrations). FIG. 4 shows an amount of distortion corresponding to the image height in the first example, FIG. 5 shows an amount of curvature of field corresponding to the image height in the first example, and FIG. 6 shows telecentricity corresponding to the image height in the first example.

In the case of the first example explained above, |f23/f1|=0.063 holds good to satisfy the aforesaid conditional expression (1), whereby, it is possible to attain high NA while controlling generation of aberrations efficiently, which makes it possible to conduct optical recording and/or reproducing that is highly accurate and is of high density.

Second Example

The second example is an objective lens wherein focal length f1 of the first lens 21 is −64.58 mm, combined focal length f23 of the second and third lenses 22 and 23 is 4.50 mm, total focal length F is 3.01 mm and numerical aperture NA on the image side is 0.71.

Specifications of the objective lens relating to the second example are shown in the following Table 3.

TABLE 3

| | $i^{th}$ surface | ri | di | ni (400 nm) | Remarks |
|---|---|---|---|---|---|
| | 0 | ∞ | | | |
| | 1 | ∞ | −0.2029 | | Aperture diameter φ 4.3 mm |
| First lens (L1) | 2 | −3.6334 | 5.5700 | 1.5869 | EFL6 |
| | 3 | −6.3037 | 0.1000 | 1.0000 | |
| Second lens (L2) | 4 | 5.9897 | 2.4800 | 1.6960 | BAF10 |
| | 5 | −64.3658 | 0.1000 | 1.0000 | |
| Third lens (L3) | 6 | 4.7440 | 4.0000 | 1.6960 | BAF10 |
| | 7 | 7.2180 | 0.5045 | 1.0000 | |
| | 8 | ∞ | 1.2000 | 1.5308 | |
| | 9 | ∞ | 0.000 | 1.0000 | |

In Table 3 above, each of the fourth to seventh surfaces is an aspheric surface. The conic constant κ of each surface and aspheric surface coefficient $A_{2i}$ are given by the following Table 4.

TABLE 4

Aspheric surface data

| 4th surface | Conic constant | κ | −1.0794 × E−0 |
|---|---|---|---|
| | Aspheric surface coefficient | A4 | +1.0874 × E−5 |
| | | A6 | +1.2825 × E−5 |
| | | A8 | −4.6517 × E−7 |
| 5th surface | Conic constant | κ | −9.0971 × E−0 |
| | Aspheric surface coefficient | A4 | +1.1933 × E−4 |
| | | A6 | +1.2401 × E−6 |
| | | A8 | −1.1471 × E−7 |
| 6th surface | Conic constant | κ | −8.6321 × E−1 |
| | Aspheric surface coefficient | A4 | +1.5484 × E−3 |
| | | A6 | +4.2862 × E−6 |
| | | A8 | +1.6523 × E−6 |
| | | A10 | +2.3021 × E−8 |
| | | A12 | +9.5000 × E−9 |
| 7th surface | Conic constant | κ | −7.9603 × E−1 |
| | Aspheric surface coefficient | A4 | +6.0118 × E−3 |
| | | A6 | −8.3057 × E−3 |
| | | A8 | +3.3438 × E−3 |
| | | A10 | −3.1534 × E−4 |
| | | A12 | −1.1502 × E−4 |

Figure 7:
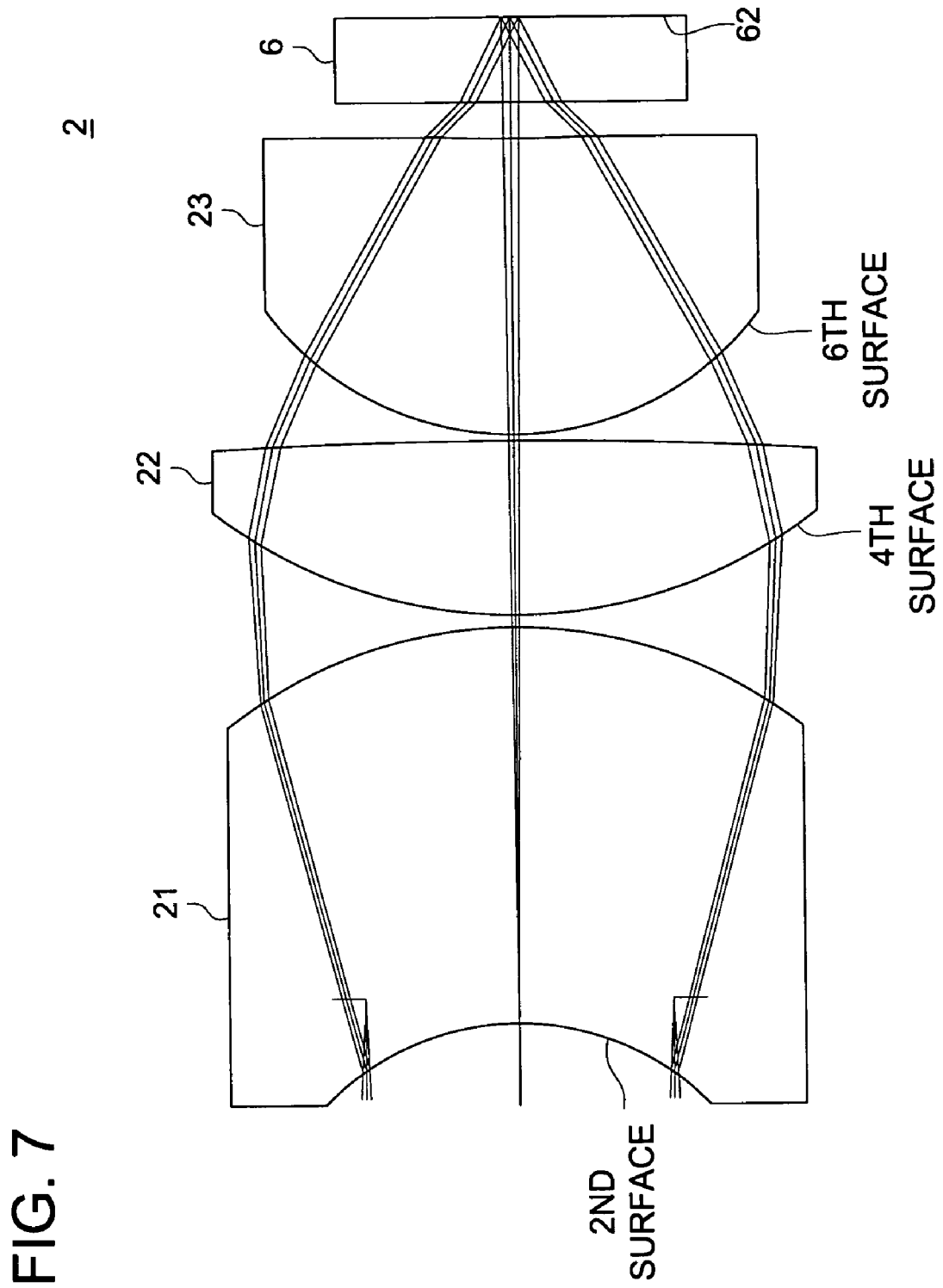
FIG. 7 is an optical path diagram of an objective lens in the second example.
Figure 8:
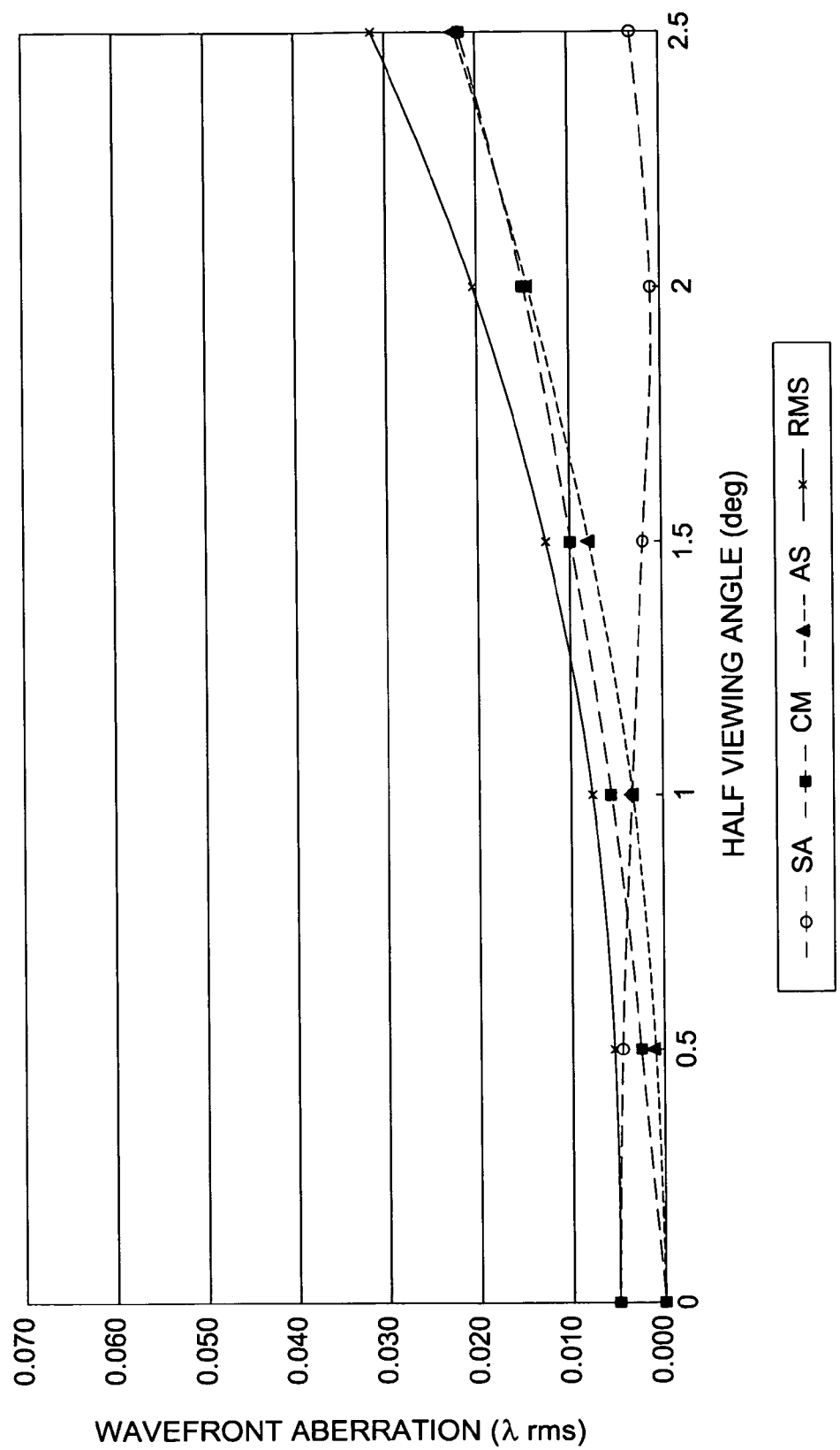
FIG. 8 is a diagram showing wavefront aberration of an objective lens in the second example.
Figure 9:
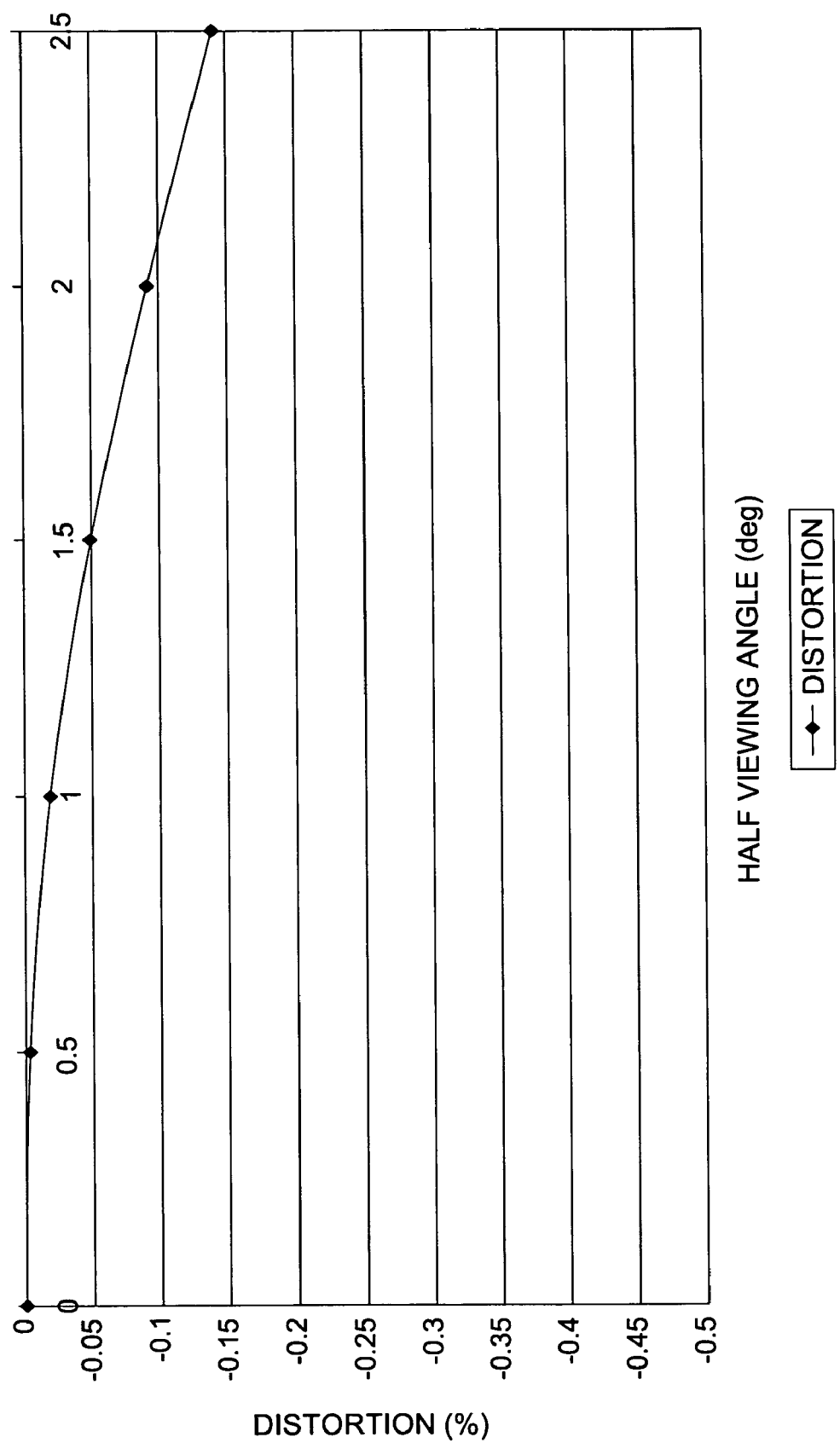
FIG. 9 is a diagram showing distortion of an objective lens in the second example.
Figure 10:
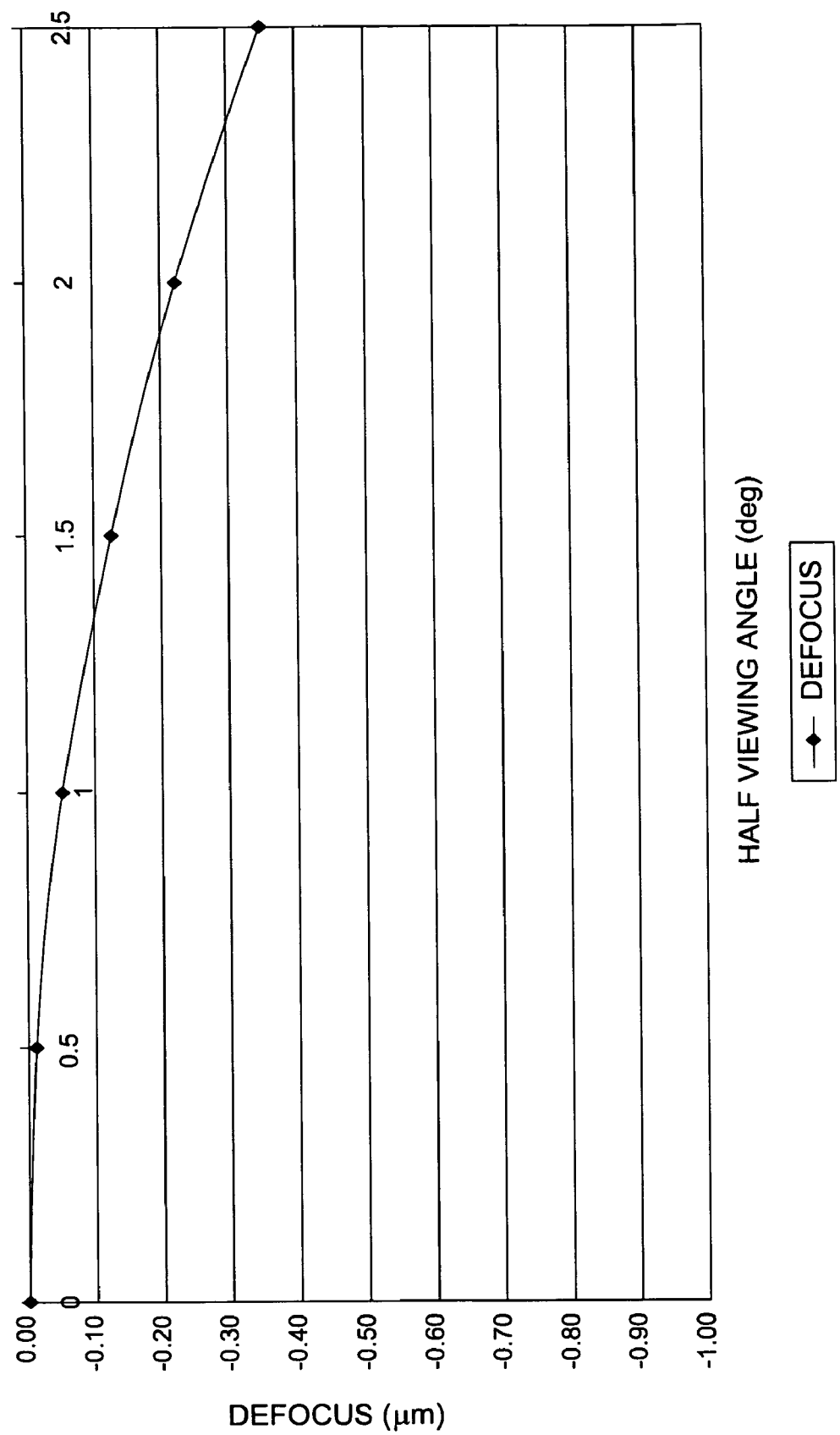
FIG. 10 is a diagram showing field curvature of an objective lens in the second example.
Figure 11:
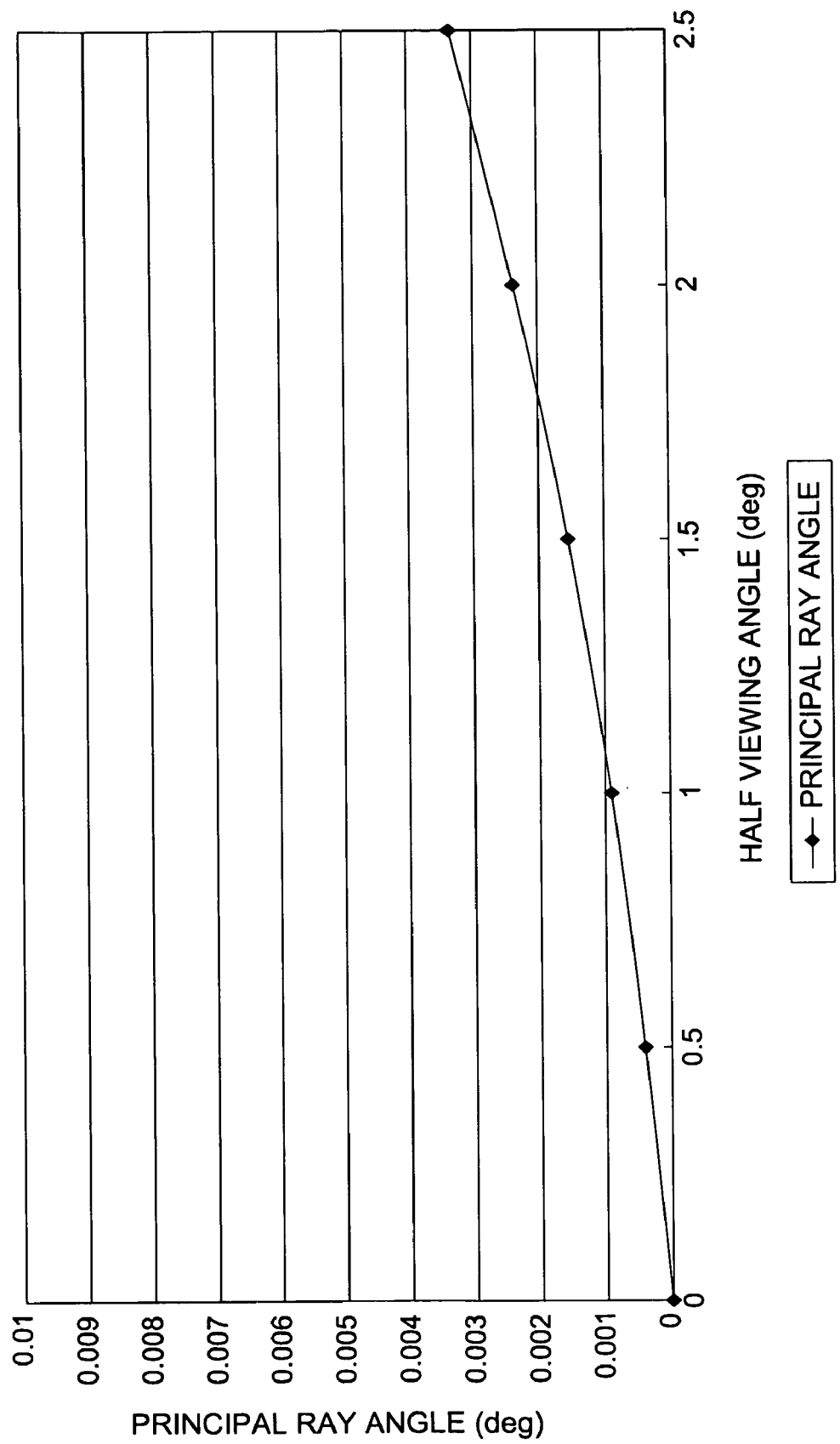
FIG. 11 is a diagram showing telecentricity of an objective lens in the second example.

FIG. 7 is an optical path diagram of objective lens 2 in the second example. Further, each of FIG. 8 to FIG. 11 shows aberration characteristics of objective lens 2 in the second example. Namely, FIG. 8 shows an amount of wavefront aberration corresponding to the image height in the second example, FIG. 9 shows an amount of distortion corresponding to the image height in the second example, FIG. 10 shows an amount curvature of field corresponding to the image height in the second example and FIG. 11 shows telecentricity corresponding to the image height in the second example.

In the case of the second example explained above, |f23/f1|=0.069 holds good to satisfy the aforesaid conditional expression (1), whereby, it is possible to attain high NA while controlling generation of aberrations efficiently, which makes it possible to conduct optical recording and/or reproducing that is highly accurate and is of high density.

In the objective lens of the invention, it is possible to attain high NA while controlling generation of various aberrations efficiently, with relatively small number of lens groups, which makes it possible to conduct optical recording and/or reproducing that is highly accurate and is of high density.

What is claimed is:

1. An objective lens for at least one of recording and reproducing for an optical information recording medium, comprising in the order from a light source side:
   (a) a first lens group having negative refracting power, which is in a meniscus shape having a concave surface facing the light source side;
   (b) a second lens group having positive refracting power; and
   (c) a third lens group having positive refracting power, which is in a meniscus shape having a concave surface facing an image side;
   wherein the following condition is satisfied:

$0.001 < |f23/f1| < 0.10$ where f1 represents a focal length of the first lens group and f23 represents a combined focal length of the second and third lens groups.

2. The objective lens of claim 1, wherein a value of numerical aperture NA on the image side satisfies the following condition:

$0.50 \geq NA < 0.90$.

3. The objective lens of claim 1, wherein the objective lens has a prescribed telecentricity on the image side.

4. The objective lens of claim 1, wherein each of the second lens group and the third lens group has an aspheric lens.

5. The objective lens of claim 1, wherein each of the first to third lens groups is formed with glass lenses.

6. An optical head having the objective lens of claim 1 that converges an incident light flux as a spot, and forms an optical spot on a recording surface of the optical information recording medium by the objective lens.

7. An optical pickup apparatus having the optical head of claim 6 that is capable of reading information on the recording surface of the optical information recording medium through the optical head, or of writing information on the recording surface.

8. An optical pickup apparatus for at least one of recording and reproducing of information for an optical information recording medium, the optical pickup apparatus comprising:
   (a) a light source emitting illuminant light having a prescribed wavelength;
   (b) the objective lens of claim 1, that converges the illuminant light coming from the light source and forms an optical spot on a recording surface of the optical information recording medium; and
   (c) a sensor that detects reflected light coming from the recording surface of the optical information recording medium through the objective lens.

* * * * *

UNITED STATES PATENT AND TRADEMARK OFFICE
CERTIFICATE OF CORRECTION

| | | |
|---|---|---|
| PATENT NO. | : 7,656,774 B2 | Page 1 of 1 |
| APPLICATION NO. | : 11/547686 | |
| DATED | : February 2, 2010 | |
| INVENTOR(S) | : Katsuya Sakamoto | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 665 days.

Signed and Sealed this

Thirtieth Day of November, 2010

David J. Kappos
*Director of the United States Patent and Trademark Office*